(12) United States Patent
Dammertz et al.

(10) Patent No.: US 8,869,665 B2
(45) Date of Patent: Oct. 28, 2014

(54) TABLE SAW DUST EXTRACTION ASSEMBLY

(75) Inventors: Ralph Dammertz, Palatine, IL (US); Juergen Wiker, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 13/285,055

(22) Filed: Oct. 31, 2011

(65) Prior Publication Data

US 2013/0104714 A1     May 2, 2013

(51) Int. Cl.
  *B23D 45/06*  (2006.01)
  *B26D 7/18*   (2006.01)
  *B23D 59/00*  (2006.01)

(52) U.S. Cl.
  CPC .............. *B23D 45/06* (2013.01); *B23D 59/006* (2013.01)
  USPC ............................................................ 83/98

(58) Field of Classification Search
  USPC ...................... 83/98–100, 477.2; 30/388–391; 451/266, 453, 456; 454/241
  See application file for complete search history.

(56) References Cited

U.S. PATENT DOCUMENTS

| | | |
|---|---|---|
| 1,986,726 A | 1/1935 | Grozier |
| 3,669,163 A | 6/1972 | Crane |
| 4,063,478 A | 12/1977 | Stuy |
| 4,721,023 A | 1/1988 | Bartlett et al. |
| 5,123,317 A | 6/1992 | Barnes, Jr. et al. |
| 5,158,001 A | 10/1992 | Udelhofen et al. |
| 6,009,782 A | 1/2000 | Tajima et al. |
| 6,139,411 A * | 10/2000 | Everts et al. .................. 451/359 |
| 6,173,499 B1 * | 1/2001 | Hegoas et al. ............... 30/123.3 |
| 7,207,115 B2 * | 4/2007 | Otake ............................. 30/391 |
| 7,882,771 B2 | 2/2011 | Sasaki et al. |
| 2002/0189417 A1 * | 12/2002 | Liao et al. ..................... 83/477.2 |
| 2004/0237743 A1 | 12/2004 | Liao et al. |
| 2005/0262706 A1 * | 12/2005 | Yoshida et al. ................. 30/388 |
| 2006/0272464 A1 | 12/2006 | Chen |
| 2009/0183377 A1 * | 7/2009 | Loveless et al. ................ 30/390 |
| 2010/0269654 A1 | 10/2010 | Needel et al. |
| 2011/0162500 A1 * | 7/2011 | Frolov ............................. 83/100 |
| 2012/0090440 A1 * | 4/2012 | Koegel et al. ................... 83/100 |

OTHER PUBLICATIONS

International Search Report in corresponding PCT Application (i.e., PCT/US2012/081816) completed Jan. 23, 2013 (13 pages).

* cited by examiner

*Primary Examiner* — Ghassem Alie

(74) *Attorney, Agent, or Firm* — Maginot Moore & Beck LLP

(57) ABSTRACT

A power tool includes a table structure defining a blade slot, a blade positioned within the blade slot, a motor assembly to rotate the blade, and a dust chute assembly. The dust chute assembly surrounds at least a portion of the blade and includes a plenum for receiving airflow scavenged from operation of the motor assembly and redirects the airflow to convey dust and debris from operation of the blade to a discharge outlet.

16 Claims, 6 Drawing Sheets

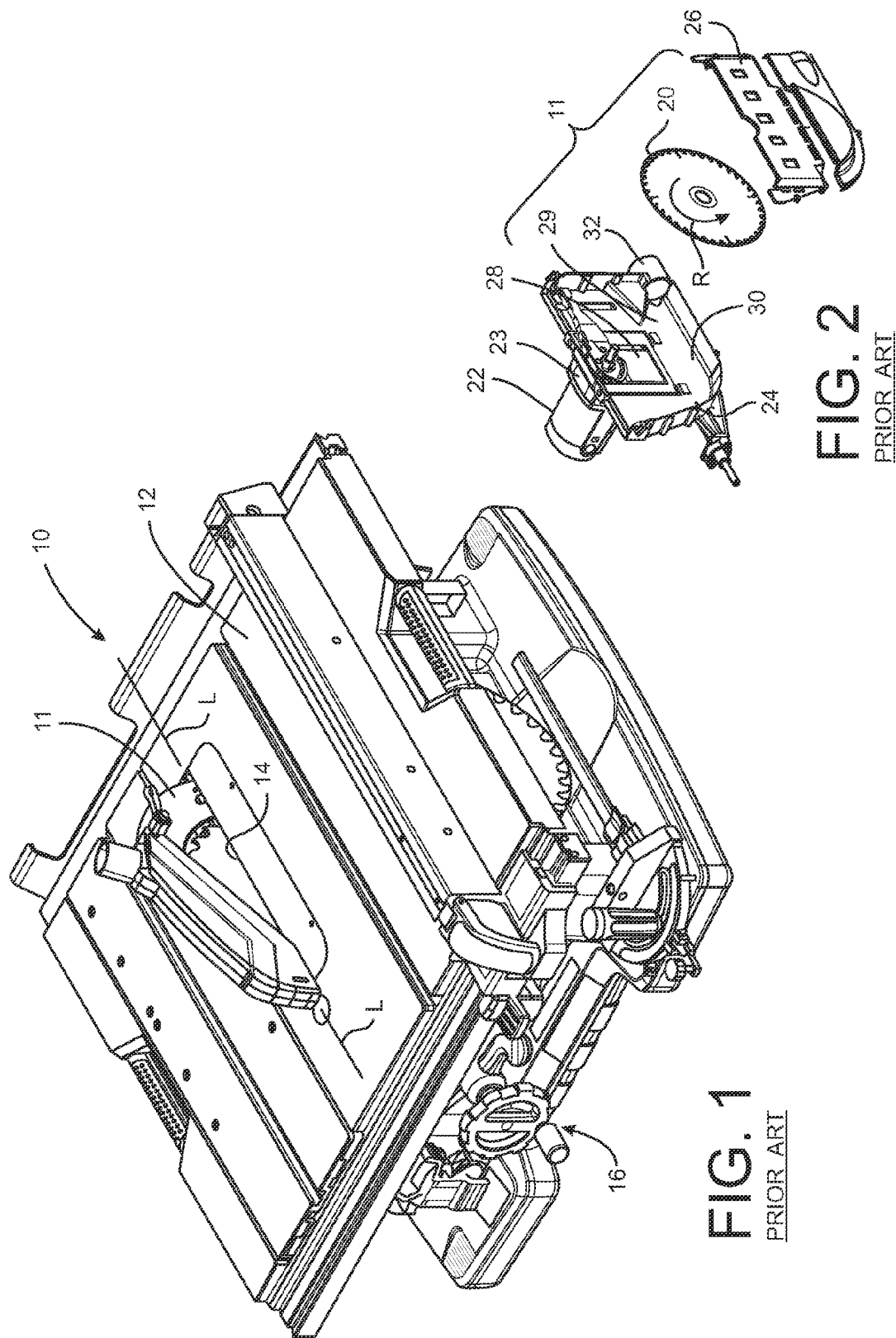

TABLE SAW DUST EXTRACTION ASSEMBLY

TECHNICAL FIELD

This patent relates generally to power tools, and particularly to power saws having a dust/debris extraction system.

BACKGROUND

One type of cutting tool is a power saw that includes an electrical motor mounted below a work surface. Users frequently refer to this type of power saw as a table saw, because the work surface resembles a tabletop. The table has an opening that allows a portion of the cutting tool, such as a saw blade, to extend above the work surface of the table. The blade, which is rotatably connected to the electrical motor, is movable relative to the surface of the table to enable a user of the table to make cuts of a particular depth or angle. For example, to adjust the height of the blade, a user may position a workpiece adjacent to the blade and then adjust the height of the blade such that the apex of the blade extends just above the thickest portion of the workpiece. To cut the workpiece, a user positions the workpiece on the table, such that a line representing the cutting path of the blade is aligned with a region of the workpiece to be cut, energizes the motor to rotate the blade, and moves the workpiece toward the rotating blade. As the blade cuts through the workpiece, it generates dust, chips, and other workpiece debris, which may be collected by a debris collection system.

Table saw debris collection systems, commonly referred to as dust collectors, direct the workpiece debris into a collection receptacle such as a bag or other suitable container. Additionally or alternatively, an external negative pressure source, such as a vacuum may be configured to draw the debris from a debris exit port of the table saw into a container. Some users, however, may desire a table saw having a dust collector, which functions effectively without a separate negative pressure source.

The efficiency of most dust collectors or dust extractors is relatively low in the absence of a vacuum applied to the discharge outlet. For a typical table saw that does not utilize vacuum, sometimes less than 50% of the dust/debris is captured in the collection bag. Even with a vacuum source, collection efficiency is typically around 90%. It is apparent that any dust that is not collected either falls around the work area or clogs the power tool, requiring user intervention to clear the working area. It is desirable to provide a dust collection or extraction system that extracts as close to 100% of the dust as possible. It is also desirable to provide such a system that can work well in the absence of a vacuum source.

SUMMARY

A power tool includes a table structure defining a blade slot, a tool blade positioned within the blade slot, a motor assembly to rotate the blade and a dust chute assembly for collecting and discharging dust and debris as the blade cuts into a workpiece. The motor assembly may be supported for movement relative to the table structure, so that the blade may translate vertically within the blade slot or translate and pivot relative to the blade slot. In one aspect, the dust chute assembly includes a fixed chute that is supported by the table and a movable chute that is supported by the motor assembly so that the movable chute moves with the motor assembly and blade. The movable chute defines a blade channel within which the tool blade is operated.

In one feature, the movable chute further defines a plenum for receiving airflow scavenged from the motor assembly. The plenum directs this scavenged airflow into a dust channel in the movable chute that runs in communication with the blade channel. Airflow through the dust channel exits the dust chute assembly at a discharge outlet that may be coupled to a dust collection container. In one attribute, the plenum includes a plurality of vanes that are curved to redirect the scavenged airflow received in the plenum into the dust channel. The vanes may be curved to impart a forward momentum to the airflow toward the discharge outlet.

In another feature, the discharge outlet receives the airflow exiting the plenum and may be configured to rotate the airflow in a vortex. The scavenged airflow and the vortex formed at the discharge outlet effectively entrains the dust and debris created during operation of the blade and forces the dust/debris through the discharge outlet.

BRIEF DESCRIPTION OF THE FIGURES

Features of the present disclosure should become apparent to those of ordinary skill in the art to which this device pertains from the following description with reference to the figures, in which:

FIG. 1 is a perspective view of a table saw.

FIG. 2 is an exploded view of certain components of the table saw of FIG. 1.

DETAILED DESCRIPTION

Figure 4:
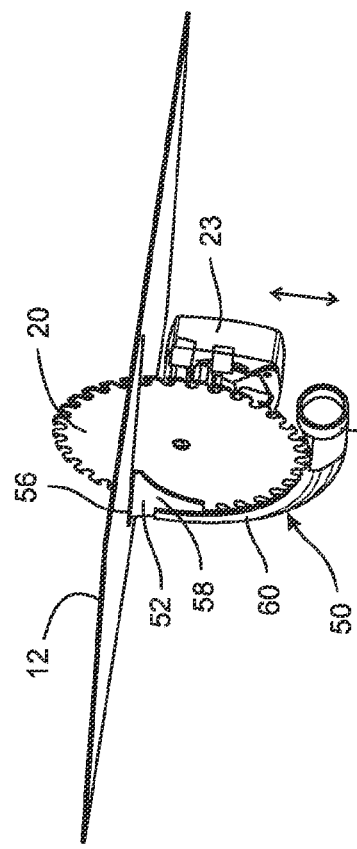
FIG. 4 is a bottom perspective view of the table saw shown in FIG. 3.

For the purpose of promoting an understanding of the principles of the device described herein, reference is made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

As shown in FIGS. 1 and 2, a power tool in the form of a table saw 10 includes a blade assembly 11, a table structure 12 and a frame 16. The table structure 12 includes an opening or slot 14 through which a top portion of the blade assembly 11 extends. The table 12 has a generally planar upper surface, which may be referred to as a work surface. The frame 16 is connected to a bottom portion of the table 12 and may have various configurations depending upon the particular use for the tool.

In certain embodiments, the blade assembly 11 has a fixed position along the longitudinal axis L of the table 12 or along the length of the slot 14. In other embodiments, the blade assembly 11 of the table saw 10 includes a mechanism for adjusting the angular and vertical position of the blade relative to the table 12, such as to adjust the depth of the cut into the workpiece.

As shown in FIG. 2, the blade assembly 11 generally includes a blade 20, an electrical motor assembly 22, and a carriage assembly 24 including a cover 26. The motor assembly 22 is supported within a channel 28 in the carriage assembly configured to allow the motor assembly, and therefore the blade 20, to move up and down relative to the table 12 and slot 14. The blade 20 may be configured for rotary or reciprocating motion, depending upon the nature of the table saw 10, and the motor assembly 22 is configured to drive the blade in the rotary or reciprocating motion. The motor assembly includes a gearbox 23 that transmits the power from the motor to the blade.

The carriage assembly 24 and cover 26 define a chamber 29 within which the blade 20 rotates when it is mounted to the motor assembly 22. The chamber 29 includes a discharge chute 30 defined at a lower portion of the chamber to direct dust and debris to an outlet 32. The chamber and discharge chute are configured to redirect dust and debris propelled by the rotation of the blade 20 in the direction R. Rotation of the blade can generate airflow that helps to further propel the debris along the discharge chute 30 to the outlet 32. It is also contemplated that suction (not shown) may be provided at the outlet 32 to assist in clearing the dust and debris from within the chamber 29.

The carriage assembly 24 and more particularly the chamber 29 and chute 30, are configured to contain and convey the as much dust and debris as possible without interfering with the operation of the blade 20. In some cases, the user may not apply vacuum, such as when working outdoors or where a vacuum source is not available. While some of the dust and debris may be discharged from the open outlet 32, dust will typically tend to accumulate within the discharge chute 30. If the outlet 32 is clogged, the dust will continue to build up within the chamber 29 until the saw blade is impeded. The user must then find some way to remove the built up dust and debris, which involves shutting the power tool down and opening the carriage assembly 24 or poking an instrument through the outlet 32 to scrape out the dust and debris from the chamber 29 or the discharge chute 30. It can be appreciated that this method for clearing the carriage assembly and the cover can be time consuming and frustrating for the user.

In accordance with one aspect of the present disclosure, a dust extraction assembly 50 is provided as shown in FIGS. 3-12. The extraction assembly 50 is configured to enhance the airflow around and past the rotating blade 20 to dislodge any accumulated dust and debris and convey it to the discharge outlet. The assembly 50 may include a fixed debris chute 52, a movable discharge chute 60 that moves with the saw blade 20, and a discharge outlet 54 that may be configured for connection to a collection container and/or a vacuum source. The fixed debris chute 52 includes a mounting flange 56 that is attached to the table 12. The chute 52 includes a chute body 58 projecting from the mounting flange 56 which defines a blade channel 59 (FIGS. 5-6) sized for a close fit around the blade 20. The flange 56 of the fixed chute 52 may be configured for engagement to the table 12 in a variety of ways provided the engagement does not interfere with the surface of the table. For example, the flange may be affixed or adhered to the underside of the table, or may engage a mounting slot (not shown) projecting from the underside of the table.

Figure 3:
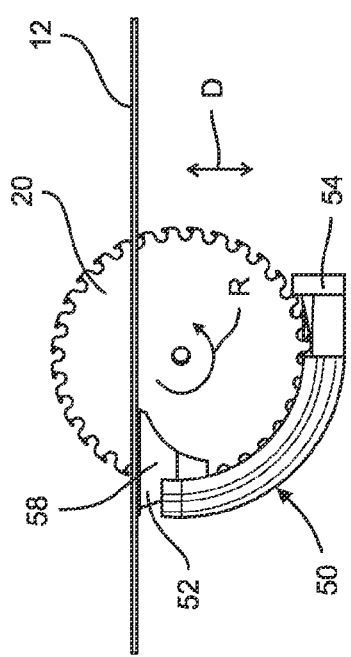
FIG. 3 is a side perspective view of the table saw of FIG. 1 with a dust chute assembly according to the present disclosure.

The movable chute 60 may be attached to the motor assembly 22, or more specifically to the gearbox 23. The chute 60 defines a channel 61 (FIGS. 6 and 7) that is sized for a close running fit around the fixed chute body 58, at least at the upper end of the chute 60. Thus, when the motor assembly moves vertically relative to the table 12, the movable chute 60 moves with it in the direction D (FIG. 3). In certain embodiments, the saw blade may be configured to tilt relative to the table 12. In these embodiments, the fixed chute body 58 may be flexible or pivotable to accommodate the angular orientation of the movable chute 60 as it follows the blade 20. In addition, the fixed chute may be configured to shift its position and/or rotate appropriately as the cutting depth is adjusted in order to follow the shifting entry point and angle of entry of the saw blade into the table. The remainder of the channel 61 may be sized for a close fit around the blade 20. It can be appreciated that the blade channel 61 communicates with the discharge outlet 54 so that debris and dust generated by the saw blade can be discharged.

Figure 5:
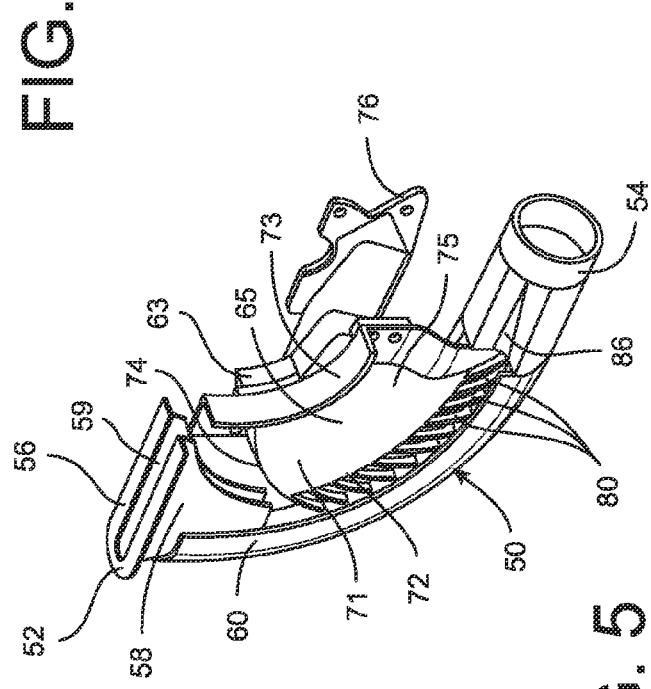
FIG. 5 is a side perspective view of the dust chute assembly shown in FIGS. 3 and 4.
Figure 7:
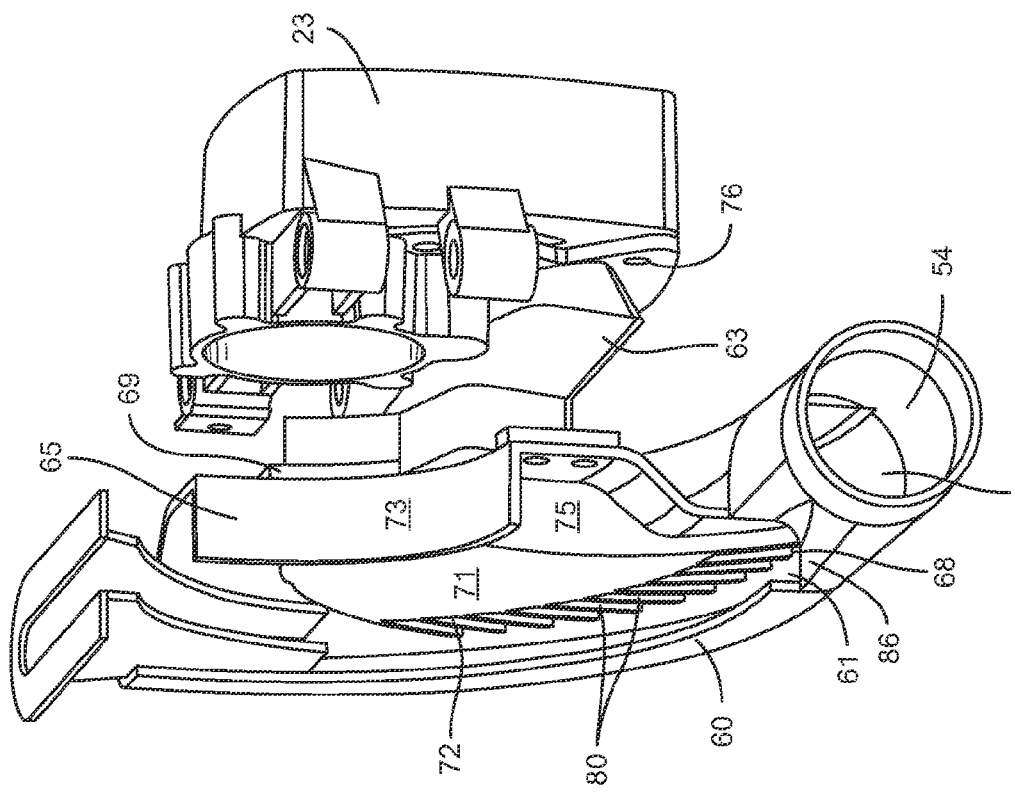
FIG. 7 is an enlarged end perspective view of the dust chute assembly shown in FIG. 5.
Figure 6:
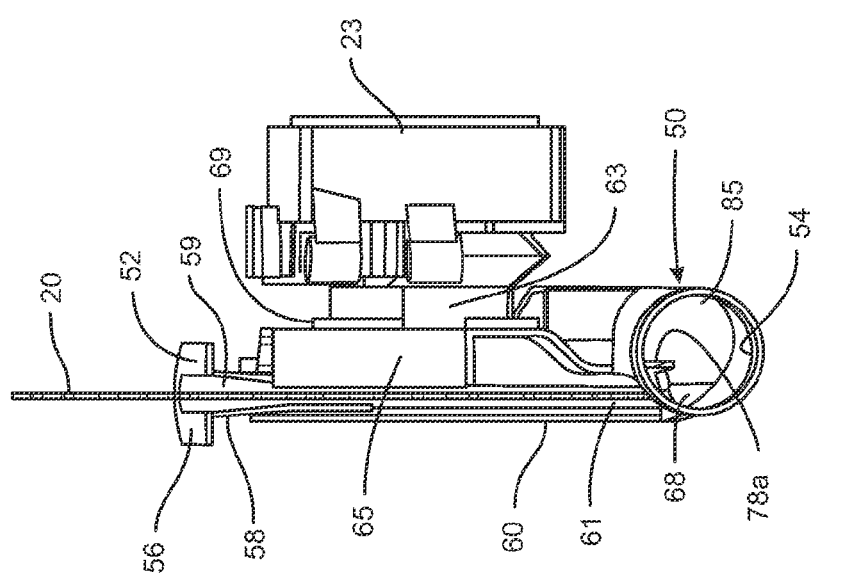
FIG. 6 is an end view of the dust chute assembly shown in FIG. 5, with the saw blade in operative position.
Figure 9:
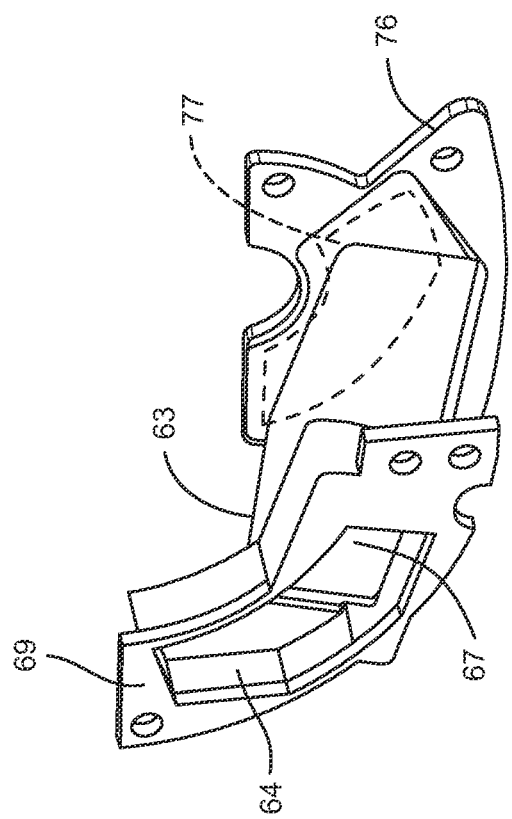
FIG. 9 is an enlarged perspective view of an airflow diverter of the dust chute assembly in the prior figures.
Figure 8:
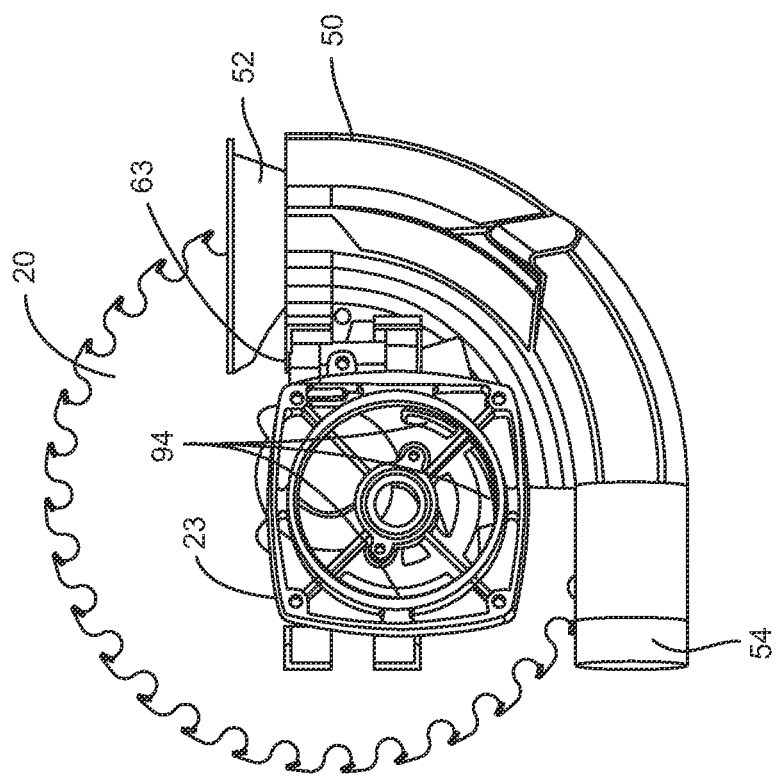
FIG. 8 is a back side view of the dust chute assembly shown in FIG. 6 with the saw blade in operative position.

As shown in FIGS. 5-7, the movable chute 60 defines a plenum 65 at the inboard side of the saw blade 20 (FIG. 6). The plenum is configured to direct airflow from the motor assembly and gearbox 23 into the blade channel 61 to enhance the airflow used to dislodge and convey dust and debris through the discharge outlet 54. Thus, in one aspect, the gearbox 23 incorporates ventilation openings 94 (FIG. 8) that face the plenum 65. Air flowing from the gearbox through the openings 94 is directed into the plenum 65 by an airflow diverter 63. As shown in FIG. 9, the airflow diverter 63 includes an opening 77 that overlays the openings 94 in the gearbox 23. An interior channel 67 directs the airflow through an outlet opening 64. The outlet opening 64 of the diverter 63 is in communication with the inlets 66 (FIG. 10) of the plenum 65. When the motor assembly and gearbox are in operation, they generate an airflow that ordinary would be discharged to the atmosphere. In accordance with the present dust extraction assembly 50, this airflow is diverted to the plenum 65 that surrounds the blade 20.

The airflow diverter 63 is provided with a first mounting surface 69 that is connected to the plenum 65 so that the diverter is sealed about the inlets 66. The diverter also includes a second mounting surface 76 that is configured to mount the diverter to the gearbox 23 with the opening 77 sealed about the vent openings 94 of the gearbox. The two mounting surfaces 69, 76 may be mounted to their respective components in any suitable manner, such as by screws or bolts, or may be affixed to either or both the plenum and gearbox, such as by an adhesive. An optional gasket or other sealing element may be introduced between the mounting surfaces and the adjacent components.

Figure 10:
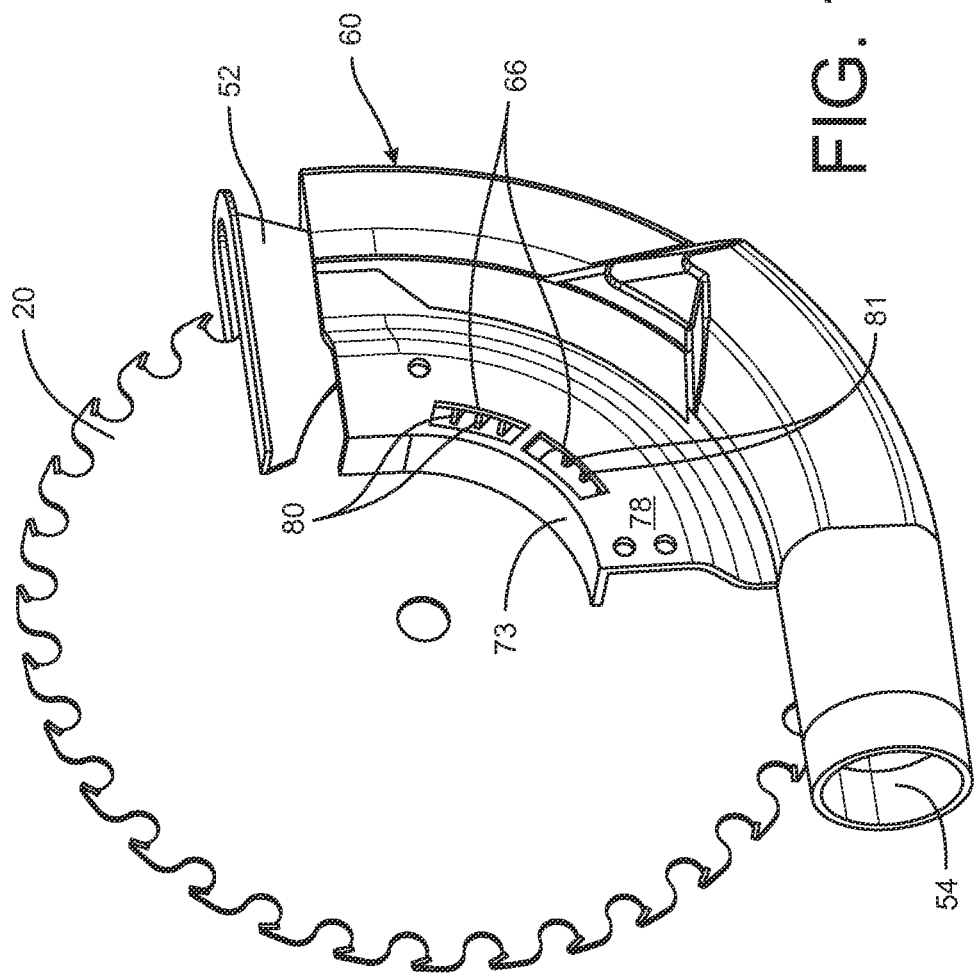
FIG. 10 is a back side perspective view of the dust chute assembly shown in FIG. 6 with a portion of the assembly removed.

The plenum 65 is defined by a radially extending blade side wall 71 (FIGS. 5 and 7) that is configured to be in close proximity to and generally parallel to the saw blade 20. The side wall 71 includes a lower edge 72 that is offset from the blade channel 61 in the movable chute 60, as best seen in FIGS. 5 and 7, the lower edge corresponding to an outlet for the plenum. The plenum is further enclosed by top wall 73, end walls 74, 75 (FIG. 5), and a back wall 78 (FIG. 10). The top wall 73 may be curved to accommodate the axle connecting the saw blade with the gearbox, as shown in FIG. 7 (the axle has been removed for clarity). The top wall 73 may support a bearing or other component of the rotary drive train powering the saw blade. The back wall 78 defines the inlets 66 and features for mounting the airflow diverter 63. The back wall, and more particularly the angled lower portion 78a of the back wall, separates the channel 85 of the discharge outlet 54 from the back of the blade 20. As seen in FIG. 6, the lower portion 78a extends radially slightly beyond the outer diameter of the blade 20. The lower portion is angled toward the discharge channel 85 so that airflow exiting the plenum flows past the lower portion 78a into the channel 85.

The plenum 65 provides a concentrated flow path for air generated by operation of the motor assembly 22 and gearbox 23. This concentrated air flow exits the plenum at its lower edge 72 to bear against the back side of the blade 20, which helps convey debris and dust along the blade channel 61 to the channel 85 of the discharge outlet 54.

Figure 12:
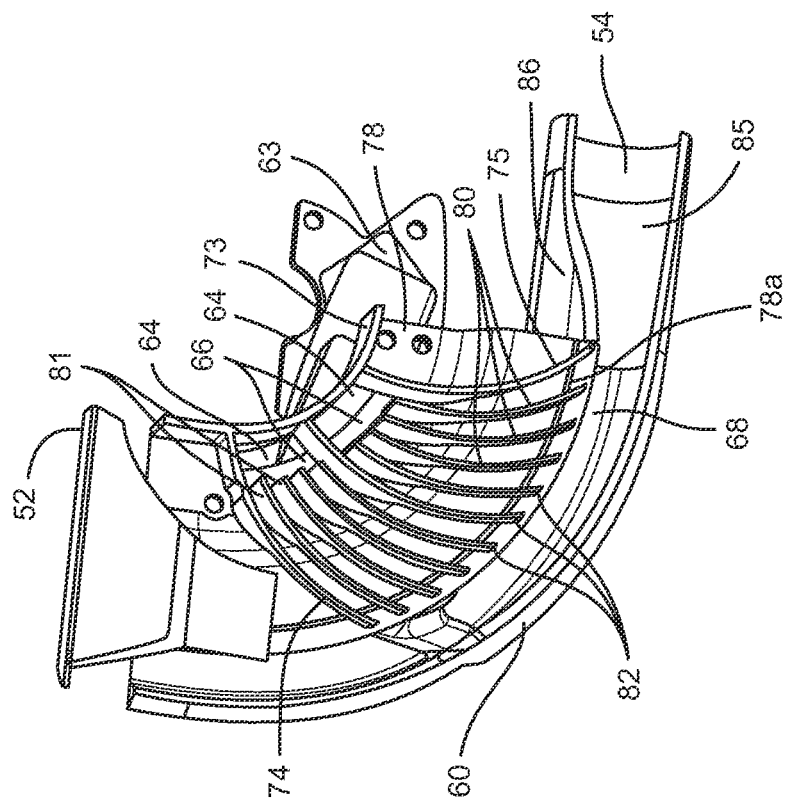
FIG. 12 is a side partial cross-sectional view of the dust chute assembly shown in FIG. 5.
Figure 11:
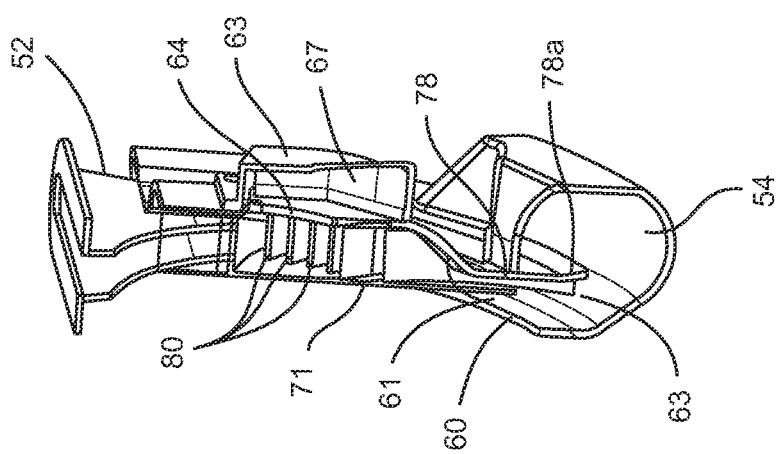
FIG. 11 is an end perspective partial cross-sectional view of the dust chute assembly shown in FIG. 10.

In order to optimize this concentrated airflow, and thereby maximize the ability to convey debris/dust, the plenum 65 is provided with curved vanes 80, as shown in FIGS. 5, 7 and 11, and best shown in the cross-section of FIG. 12. The upper edge 81 of the vanes are aligned with the inlets 66 (see FIG. 10) to receive the air directed through the diverter 63. As shown in FIG. 12, the vanes are curved in the direction of rotation of the blade from the upper edge 81 to their lower edge 82. The lower edges of the vanes extend beyond the outlet or discharge edge 72 of the plenum and terminate just above the dust channel 68 that runs generally parallel and in communication with the blade channel 61 (see also FIG. 7). The dust channel communicates with the blade channel 59 of the fixed chute 52 to convey dust/debris to the discharge outlet 54.

In one aspect, the curvature of the vanes 80 increases from the end wall 74 to the end wall 75. Thus, the exit angle of air flowing across each vane gradually aligns with the direction of the dust channel 68 to provide a smooth flow transition and to avoid any turbulence at the discharge edge 72 of the plenum 65. The dust channel 68 includes a surface angled toward the channel 85 of the discharge outlet 54. The vanes 80 are configured to provide a generally laminar air flow through the plenum 65. Due to the velocity and direction of this airflow in combination with the geometry of the dust channel 68, that airflow enters the channel 85 of the discharge outlet 54 creating a vortex. In particular, the increased airflow created by the plenum and vanes enters the channel 85 of the discharge outlet 54 and begins rotating around the interior of the channel. This vortex flow is isolated from the rotating blade by the radial wall 86.

Dust and debris created as the saw blade cuts through the workpiece passes into the fixed chute 52 and is propelled at least initially by the rotation of the blade. When the dust/debris reaches the area near the plenum 65 and the dust channel 68, the lower air pressure generated by the high velocity airflow scavenged from the motor assembly 22 pulls air and dust from around the saw blade into the channel. The successive vanes 80 gradually increase the forward momentum of the airflow, and ultimately the dust/debris, in the direction of the discharge outlet and in a manner that avoids turbulence within the dust channel 68. Once the dust/debris reaches the end of the plenum, and more particularly the last of the vanes 80, the vortex airflow through the discharge channel 85 fully entrains the dust and ensures that it does not escape from the dust chute assembly 50. The airflow exiting the discharge outlet 54 thus forces all the debris passing into the dust channel 68 through the outlet and into the collection container (not shown).

It is believed that the airflow scavenged from the motor assembly 22 and gearbox 23 may create a venturi effect as it exits from the vanes 80. This venturi effect thus draws additional ambient air from around the circumference of the saw blade into the dust channel 68. The result is that the airflow exiting through the discharge outlet 58 is greater than the airflow generated by the motor assembly and diverted to the plenum 65. For example, dynamic simulations of the dust chute assembly and working saw blade show a discharge flow rate that is about 50% greater than the motor airflow passing through the air diverter 63. This "excess" airflow is attributable to ambient air drawn in from the front of the saw blade. This ambient airflow helps capture all dust/debris created as the blade cuts into the workpiece and helps draw any dust/debris from the table into the dust chute assembly 50. Even without the use of vacuum assist, the dust chute assembly can capture almost 100% of the dust and debris entering the fixed chute from above the table with the rotation of the saw blade. This efficiency can be reached without the addition of vacuum at the discharge outlet 54.

In one aspect of the dust chute assembly 50, the assembly only covers a small portion of the saw blade, as seen in FIG. 3, but still extracts almost all of the dust and debris during operation of the blade. This aspect allows for easier access to the blade, such as when it is desired to replace the blade. In another aspect, the airflow diverter 63 of the dust chute assembly is disposed entirely below the table 12. Moreover, the diverter is situated between the motor assembly 22 and the blade 20 which not only provides a small profile for the dust chute assembly, but also minimizes the surfaces that might collect any dust/debris that escapes collection.

The devices and apparatuses described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A power tool comprising:
   a table structure defining a blade slot;
   a blade operably positioned within said blade slot;
   a motor assembly coupled to said blade to operate the blade, said motor assembly generating an airflow during operation; and
   a dust chute assembly disposed adjacent said blade, said dust chute assembly defining a dust channel for receiving dust and debris generated by operation of said blade and a discharge outlet in communication with said dust channel, said dust chute assembly including a plenum receiving the airflow from said motor assembly at an inlet and configured to redirect said airflow at an outlet into said dust channel, said plenum including a number of fixed vanes extending from said inlet to said outlet, said vanes configured to direct airflow into said dust channel and to impart momentum to the airflow toward the discharge outlet,
   wherein said motor assembly is movably supported by said table structure to change the position of said blade relative to said table structure; and
   said plenum of said dust chute assembly is supported by said motor assembly so that said plenum moves with said motor assembly.

2. The power tool of claim 1, wherein at least one of said number of vanes is curved toward said discharge outlet to direct airflow through said discharge outlet.

3. The power tool of claim 1, wherein:
   said outlet of said plenum extends along a length of said dust channel toward said discharge outlet; and said number of vanes includes a plurality of vanes spaced apart within said plenum along said length of said dust channel.

4. The power tool of claim 3, wherein each of said plurality of vanes is curved toward said discharge outlet to direct airflow through said discharge outlet.

5. The power tool of claim 1, wherein:
said blade is a rotary saw blade; and
at least one of said number of vanes extends radially with respect to the saw blade.

6. The power tool of claim 1, wherein the dust chute assembly includes:
a fixed chute supported on said table structure and defining a blade channel for receiving said blade therethrough; and
a movable chute, including said plenum, supported by said motor assembly for movement relative to said fixed chute and defining a blade channel for receiving said blade therethrough.

7. The power tool of claim 6, wherein said fixed chute and said movable chute include overlapping portions configured to overlap for all positions of said movable chute relative to said fixed chute.

8. The power tool of claim 1, wherein:
said blade is a rotary saw blade; and
said discharge outlet includes a discharge channel; and
said plenum includes a radially extending side wall disposed immediately adjacent said blade and an opposite side wall, said opposite side separating a portion of said dust channel from said discharge channel, said side wall having a radial extent slightly greater than the radial extent of said blade.

9. The power tool of claim 1, wherein:
said motor assembly includes exhaust openings for passage of said airflow and arranged toward said plenum;
said inlet of said plenum is arranged toward said motor assembly; and
said dust chute assembly includes an airflow diverter connected between said exhaust openings and said inlet to said plenum.

10. A power tool, comprising:
a table structure defining a blade slot;
a blade operably positioned within said blade slot;
a motor assembly coupled to said blade to operate the blade, said motor assembly generating an airflow during operation; and
a dust chute assembly disposed adjacent said blade, said dust chute assembly defining a dust channel for receiving dust and debris generated by operation of said blade and a discharge outlet in communication with said dust channel, said dust chute assembly including a plenum receiving the airflow from said motor assembly at an inlet and configured to redirect said airflow at an outlet into said dust channel, said plenum including a number of fixed vanes extending from said inlet to said outlet, said vanes configured to direct airflow into said dust channel and to impart momentum to the airflow toward the discharge outlet, wherein;
said outlet of said plenum extends along a length of said dust channel toward said discharge outlet;
said number of vanes includes a plurality of vanes spaced apart within said plenum along said length of said dust channel, and
each of said plurality of vanes is curved toward said discharge outlet and the curvature of each of said plurality of vanes defines an exit angle of airflow exiting the vane, and the curvature increases for each successive vane along said length of said dust channel toward said discharge outlet so that the exit angle of successive vanes gradually aligns with the direction of said discharge outlet.

11. A dust chute assembly for a power tool having a table structure defining a blade slot, a blade operably positioned within the blade slot and a motor assembly coupled to the blade to operate the blade, the motor assembly generating an airflow during operation, comprising:
a chute body defining a dust channel for receiving dust and debris generated by operation of the blade and a discharge outlet in communication with said dust channel;
a plenum supported by the motor assembly and having an inlet arranged to receive the airflow from the motor assembly and configured to redirect the airflow at a outlet into said dust channel;
a number of fixed vanes disposed within said plenum and extending from said inlet to said outlet, said vanes configured to direct airflow into said dust channel and to impart momentum to the airflow toward the discharge outlet
a fixed chute supported on the table structure and defining a blade channel for receiving the blade therethrough; and
a movable chute, including said plenum, supported by the motor assembly for movement relative to said fixed chute and defining a blade channel for receiving the blade therethrough.

12. The dust chute assembly of claim 11, wherein at least one of said number of vanes is curved toward said discharge outlet to direct airflow through said discharge outlet.

13. The dust chute assembly of claim 11, wherein:
said outlet of said plenum extends along a length of said dust channel toward said discharge outlet; and
said number of vanes includes a plurality of vanes spaced apart within said plenum along said length of said dust channel.

14. The dust chute assembly of claim 13, wherein each of said plurality of vanes is curved toward said discharge outlet to direct airflow through said discharge outlet.

15. The dust chute assembly of claim 14, wherein the curvature of each of said plurality of vanes defines an exit angle of airflow exiting the vane, and the curvature increases for each successive vane along said length of said dust channel toward said discharge outlet so that the exit angle of successive vanes gradually aligns with the direction of said discharge outlet.

16. The dust chute assembly of claim 11 in which the motor assembly includes exhaust openings for passage of the airflow; wherein
said plenum is supported on the motor assembly so that said inlet of said plenum is arranged toward the exhaust openings; and
said dust chute assembly includes an airflow diverter connected between said exhaust openings and said inlet to said plenum.

* * * * *